(12) United States Patent
Popescu et al.

(10) Patent No.: US 7,994,758 B2
(45) Date of Patent: Aug. 9, 2011

(54) SYSTEM AND METHOD FOR IMPROVING EFFICIENCY OF A POWER FACTOR CORRECTION BOOST PRE-REGULATOR

(75) Inventors: Lucian Popescu, Austin, TX (US); Constantin D. Livescu, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 336 days.

(21) Appl. No.: 12/199,199

(22) Filed: Aug. 27, 2008

(65) Prior Publication Data
US 2010/0052641 A1 Mar. 4, 2010

(51) Int. Cl.
*G05F 1/40* (2006.01)
*H02M 3/335* (2006.01)
(52) U.S. Cl. ...................... 323/235; 363/21.03
(58) Field of Classification Search ............... 323/901, 323/908, 235, 238, 271, 282, 292; 363/21.03
See application file for complete search history.

(56) References Cited

U.S. PATENT DOCUMENTS

| | | | |
|---|---|---|---|
| 6,680,629 B2 * | 1/2004 | Rankin et al. | 327/108 |
| 7,093,048 B2 | 8/2006 | Bobbitt et al. | |
| 2007/0085515 A1 * | 4/2007 | Nishida | 323/225 |
| 2007/0257647 A1 * | 11/2007 | Chen et al. | 323/282 |
| 2009/0128111 A1 * | 5/2009 | Chang Chien | 323/282 |
| 2009/0302814 A1 * | 12/2009 | Kapels et al. | 323/282 |

OTHER PUBLICATIONS

U.S. Appl. No. 11/970,977, filed Jan. 8, 2008.

* cited by examiner

*Primary Examiner* — Adolf Berhane
*Assistant Examiner* — Emily Pham
(74) *Attorney, Agent, or Firm* — Larson Newman, LLP

(57) ABSTRACT

A power supply device comprises a driver circuit, a transistor switch, and a first transistor. The driver circuit is configured to provide a stable driving signal and a floating driving signal. The transistor switch has a first terminal, a second terminal connected to a first terminal of the driver circuit, and a third terminal connected to a second terminal of the driver circuit, and is configured to prevent a reverse current based on the floating driving signal. The first transistor has a first current electrode connected to the first terminal of the transistor switch, a second current electrode connected to the first voltage reference, and a control electrode connected to the third terminal of the driver circuit, and is configured to activate and deactivate based on the stable driving signal, and further configured to regulate an input voltage to a substantially constant direct current output voltage.

19 Claims, 4 Drawing Sheets

US 7,994,758 B2

SYSTEM AND METHOD FOR IMPROVING EFFICIENCY OF A POWER FACTOR CORRECTION BOOST PRE-REGULATOR

FIELD OF THE DISCLOSURE

This disclosure generally relates to power supplies, and more particularly relates to a system and method for improving the efficiency of a boost pre-regulator.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Computer systems typically rely on switch mode power supplies to assure the hardware interface between the available power source, such as an alternating current (AC), and the information handling system components. During start-up (first turned 'ON') or after brown-out events (temporary loss of an input voltage), a switch mode power supply may draw an inrush input current. The inrush current can lead to major problems in the switch mode power supplies. The inrush current can over-stress the internal input components and can lead to a safety circuit breaker disconnecting an external electrical power circuit. The inrush current can also momentarily distort the available AC input voltage, generating power grid perturbations that can affect other electronic devices connected to the same AC power source. Additionally, a boost switch can have large switching losses based on a reverse recovery phenomenon of a boost silicon diode in the boost switch.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
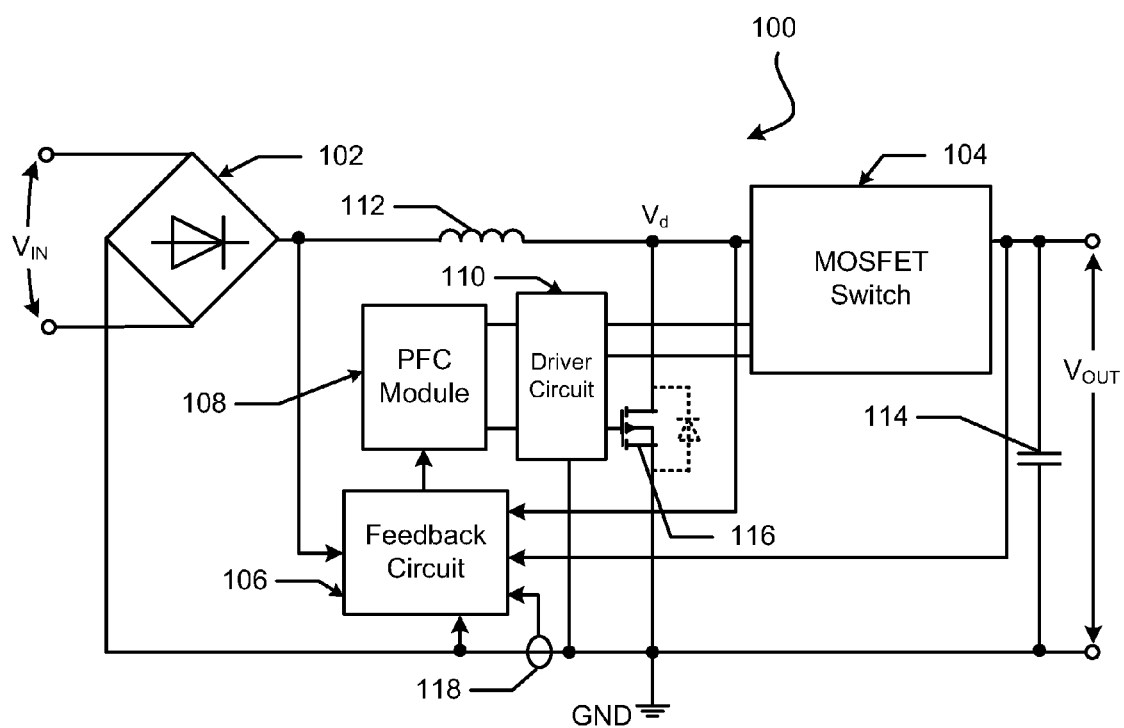
FIG. 1 is a block and schematic diagram of a particular embodiment of a power supply device.

FIG. 1 shows a power supply 100 for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The power supply device 100 includes a diode bridge 102, a metal-oxide-semiconductor field-effect transistor (MOSFET) switch 104, a feedback circuit 106, a power factor correction (PFC) module 108, and a driver circuit 110. The power supply device 100 can also include an inductor 112, a capacitor 114, a transistor 116, and a current sensor 118. The inductor 112 can be a boost inductor, and the transistor 116 can be a MOSFET, or a similar type of transistor.

The diode bridge 102 includes first and second terminals connected to a first voltage reference, $V_{IN}$, a third terminal, and a fourth terminal connected to a second voltage reference, GND. The MOSFET switch 104 includes first and second terminals, a third terminal coupled to the third terminal of the diode bridge 102, and a fourth terminal connected to an output voltage, $V_{OUT}$. The feedback circuit 106 includes a first terminal connected to the third terminal of the diode bridge 102, a second terminal, and a third terminal connected to the first terminal of the MOSFET switch 104. The feedback circuit 106 also includes a fourth terminal connected to the fourth terminal of the MOSFET switch 104, a fifth terminal, and a sixth terminal connected to the second voltage reference, GND.

The PFC module 108 has a first terminal connected to the second terminal of the feedback circuit 106, and second and third terminals. The driver circuit 110 has a first terminal connected to the third terminal of the PFC module 108, and a second terminal connected to the second terminal of the PFC module. The driver circuit 110 also has a third terminal connected to the second terminal of the MOSFET switch 104, a fourth terminal connected to the first terminal of the MOSFET switch, a fifth terminal, and a sixth terminal connected to the second voltage reference, GND.

The inductor 112 has a first terminal connected to the third terminal of diode bridge 102, and a second terminal connected to the third terminal of the MOSFET switch 104. The capacitor 114 has a first terminal connected to the fourth terminal of the MOSFET switch 104, and a second terminal connected to the fourth terminal of the diode bridge 102. The transistor 116 has a first current electrode connected to the third terminal of the MOSFET switch 104, a second current electrode connected to the second voltage reference, and a control electrode connected to the fifth terminal of the driver circuit 110. The current sensor 118 has a first terminal connected to the fifth terminal of the feedback circuit 106.

The diode bridge 102 rectifies an alternating current (AC) input voltage, $V_{IN}$, received across the first and second terminals. The MOSFET switch 104 receives a floating driving signal. Based on the floating driving signal, the MOSFET switch can either activate to allowing a current to pass through the MOSFET switch, or can deactivate to prevent the current from passing through the MOSFET switch. The feedback circuit 106 provides a control signal based on a rectified input voltage, an input current level, a drain voltage, $V_d$, and a DC output voltage, $V_{OUT}$.

The PFC module 108 provides a high-side pulse width modulated (PWM) signal and a low-side PWM signal based on the rectified input voltage, the input current level, the drain voltage, $V_d$, and the output voltage, $V_{OUT}$. Based on variations in the rectified input voltage, the input current level, the drain voltage, and the output voltage, the PFC module 108 varies a duty cycle of the PWM signals so that the output voltage is regulated to a substantially constant DC voltage.

The driver circuit 110 provides a stable driving signal based on a low-side PWM signal, and provides a floating driving signal based on a high-side PWM signal. The driver circuit 110 can preferably include a high-side input/output, along with a low-side input/output. The high-side and low-side input/outputs can be used to provide different driving signal to different devices within the power supply device 100. The stable driving signal can have a zero to ten volts range in relation to the second voltage reference, GND. The floating driving signal can also have a zero to ten volts range, however the stable driving signal is in relation to a floating source point. The floating source point can be the voltage provided to the fourth terminal of the driver circuit 110.

Based on the input current associated with the rectified input voltage, the inductor 112 stores energy for discharge. The capacitor 114 stores the bulk voltage based on the rectified input voltage. The transistor 116 activates and deactivates based on the stable driving signal, and regulates the rectified input voltage based on the frequency and duty-cycle at which the transistor activates and deactivates. The current sensor 118 measures an input current level to determine whether the power supply device is under a high current load or a light current load.

Figure 2:
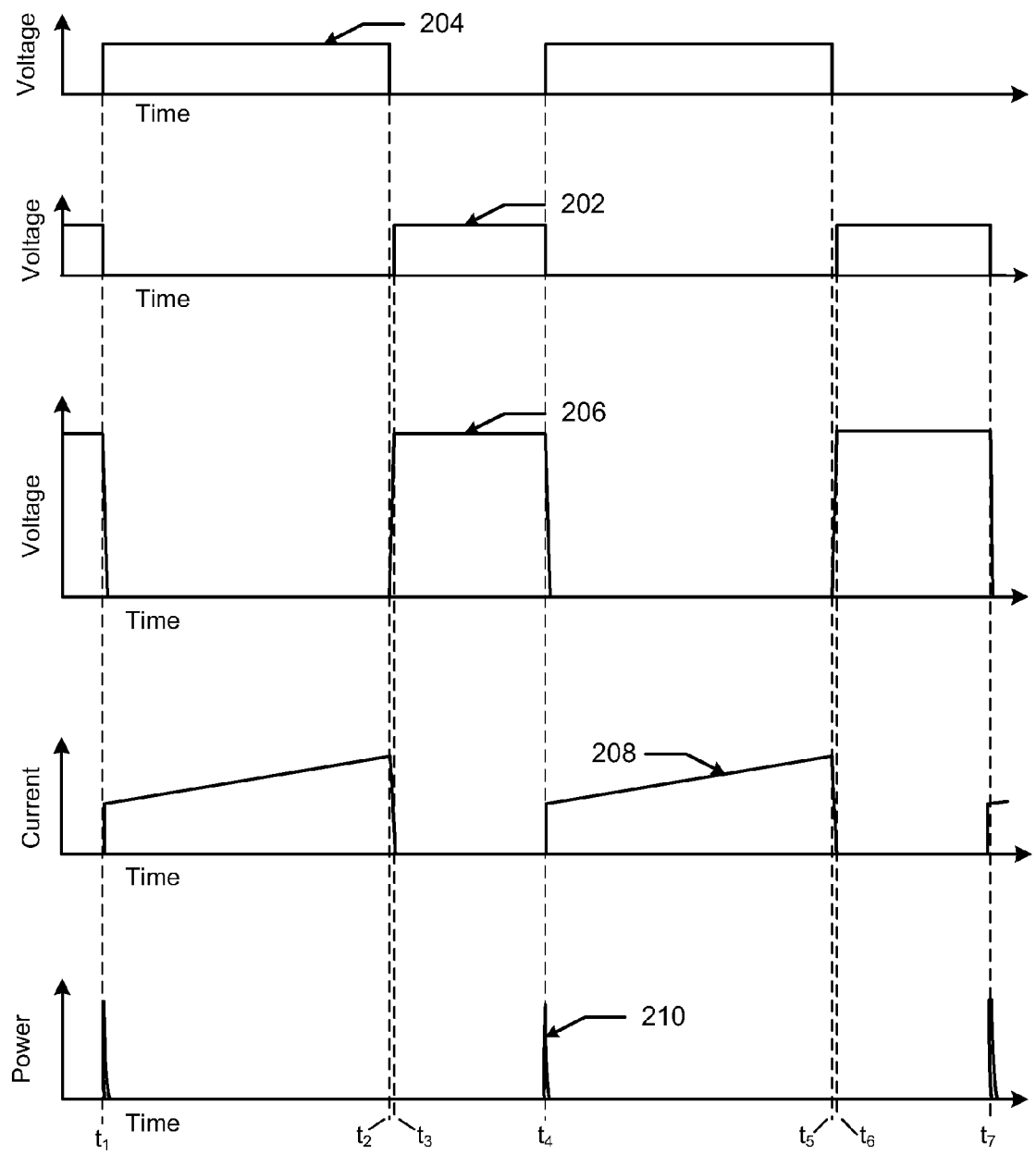
FIG. 2 is a plurality of waveforms associated with the power supply device.

During operation, the rectified input voltage is applied to the MOSFET switch 104 and to the transistor 116. At start-up, the feedback circuit 106 monitors the rectified input voltage, and transmits a start-up control signal to the PFC module 108 upon detecting a zero crossing of the rectified input voltage. Upon receiving the start-up control signal, the PFC module 108 sends a high-side PWM signal 202, as shown in FIG. 2, to the driver circuit 110. The floating driving signal is then transmitted to the MOSFET switch 104 as a voltage difference between the voltages on the third and fourth terminals of the driver circuit 110. Upon receiving the floating driving signal, the MOSFET switch 104 is activated.

The floating driving signal is preferably a floating source signal, such that the MOSFET switch 104 can be gradually brought to saturation over a few cycles of the rectified input voltage to limit an inrush current present in the power supply device 100 at start-up. While the MOSFET switch 104 is gradually brought to saturation, the capacitor 114 is charged and the input current is preferably kept at low levels. When the capacitor 114 is completely charged, the voltage across the capacitor, $V_{OUT}$, is substantially equal to the drain voltage, $V_d$. When the feedback circuit 106 detects $V_d$, the feedback circuit sends a steady-state control signal to the PFC module 108. At this point, the voltage at node $V_d$ can also be substantially equal to $V_{OUT}$, because there is a relative short circuit created by the MOSFET switch 104 when it is saturated.

Upon receiving the steady-state control signal, the PFC module 108 outputs the high-side PWM signal 202 and a low-side PWM signal 204 to the driver circuit 110, as shown in FIG. 2. At $t_1$, the high-side PWM signal 202 deactivates the MOSFET switch 104, and the low-side PWM signal 204 activates the transistor 116. Upon receiving the low-side PWM signal 204, the impedance of the transistor 116 continually decreases until the transistor reaches saturation. Thus, the impedance of the transistor 116 is substantially equal to zero creating a short circuit between the node $V_d$ and the second voltage reference, GND, and dropping a voltage level 206, at node $V_d$, to zero as shown in FIG. 2. Additionally, when the transistor 116 is activated, the current from the inductor 112, merely constant during the switching process, starts flowing through the transistor 116 as shown as a current 208 in FIG. 2. The activation and saturation of the transistor 116 produces a power loss 210, as shown in FIG. 2, in the power supply device 100. The smaller the spike in the power loss 210, the greater the efficiency of the power supply device 100. Also at this time, the current through the MOSFET switch 104 gradually drops to zero. Prior to the voltage level 206, at the node $V_d$, dropping to zero, the MOSFET switch 104 is off. Thus, there is no reverse current through the MOSFET switch 104, and as a result the amount of switching losses is significantly reduced.

At $t_2$ the low-side PWM signal 204 deactivates the transistor 116, and the current from the inductor 112 stops flowing through the transistor as shown by the current 208 in FIG. 2. The MOSFET switch 104 and transistor 116 are both off, and thus the current from the inductor 112 discharges the parasitic output capacitors (not shown) of the MOSFET switch and charges the parasitic output capacitors of the transistor. The charging/discharging of the parasitic capacitors allows the voltage level 206, at node $V_d$, to ramp-up until it reaches $V_{OUT}$. At $t_3$ the feedback circuit 106 determines that the voltage level 206, at node $V_d$, is substantially equal to $V_{OUT}$ and sends a control signal to the PFC module 108 to activate the MOSFET switch 104 in a lossless zero switching voltage transition (ZVT). The MOSFET switch 104 is activated in a lossless ZVT because at activation $V_d$ is substantially equal to $V_{OUT}$, such that there is not a voltage drop across the MOSFET switch. Thus, there are not any energy losses resulting from the activation of the MOSFET switch 104. The power supply device 100 operates in substantially the manner at $t_4$, $t_5$, $t_6$, and $t_7$ as $t_1$, $t_2$, $t_3$, and $t_4$ as shown in FIG. 2.

Additionally, if a brown-out event is detected by the feedback circuit 106, a brown-out control signal is sent to the PFC module 108. A brown-out event occurs when the input voltage level is zero for an extended amount of time. Upon receiving the brown-out control signal, the PFC module 108 sends PWM signals to the driver circuit 110 which results in the MOSFET switch 104 and the transistor 116 being deactivated. After the brown-out event, the feedback circuit 106 prevents the inductor 112 from being saturated from an inrush current because the MOSFET switch 104 and the transistor 116 are deactivated. Upon detection of a zero crossing of the rectified input voltage, the feedback circuit 106 sends the start-up signal to the PFC module and to the power supply device 100 operates as stated above.

Figure 3:
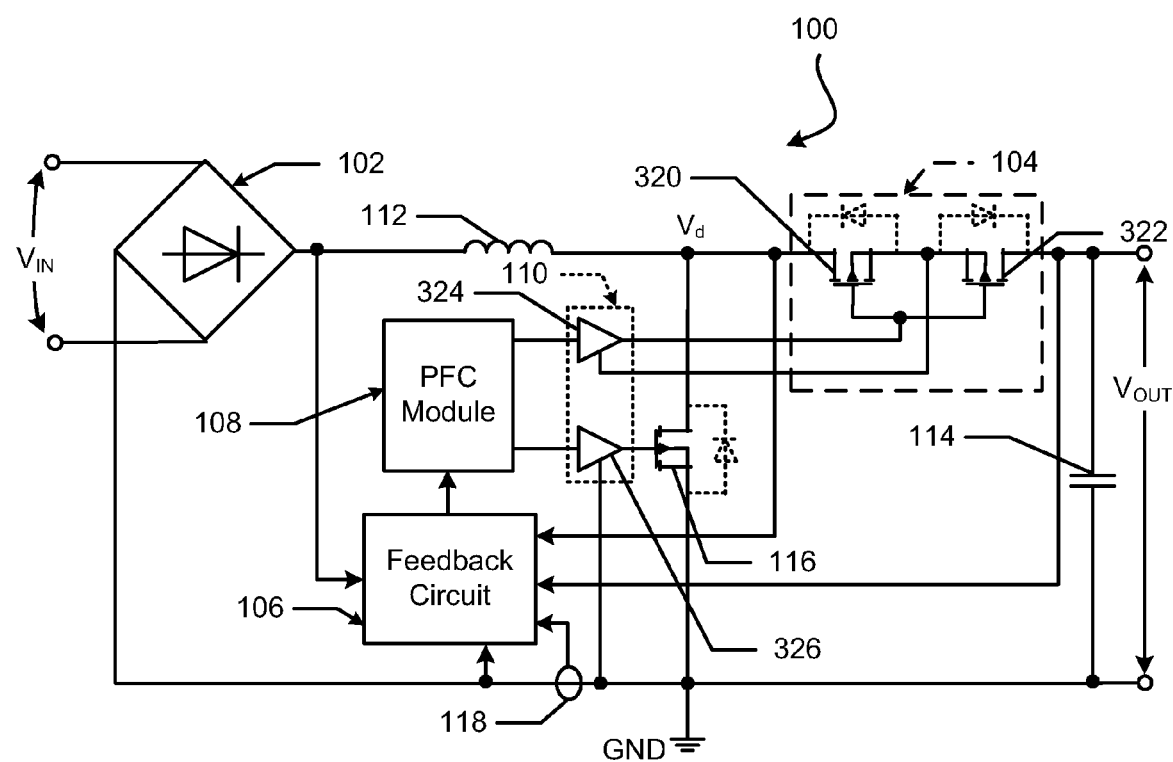
FIG. 3 is a block and schematic diagram of the power supply device in greater detail.

FIG. 3 shows the power supply device 100 including the MOSFET switch 104 having transistors 320 and 322, and the driver circuit 110 having a high-side driver 324 and a low-side driver 326. The transistor 320 has a first current electrode connected to the second terminal of the inductor 112, a second current electrode, and a control electrode. The transistor 322 has a first current electrode connected to the second current electrode of the transistor 320, a second current electrode connected to the first terminal of the capacitor 114, and a control electrode connected to the control electrode of the transistor 320. The high-side driver 324 has an input terminal connected to the second terminal of the PFC module 108, an output terminal connected to the control electrode of the transistor 320, and a floating source point terminal connected to the second current electrode of the transistor 320. The low-side driver 326 has an input terminal connected to the third terminal of the PFC module 108, an output terminal connected to the control electrode of the transistor 116, and a stable source point terminal connected to the second voltage reference, GND.

Upon start-up of the power supply device 100, the high-side driver 324 receives the high-side PWM signal 202 from the PFC module and sends the floating source point driving signal to the transistors 320 and 322. The floating source point driving signal activates the transistors 320 and 322, and allows the current from the inductor 112 to flow through the transistors. As the transistors 320 and 322 saturate and the feedback circuit 106 detects that the output voltage, $V_{OUT}$, is substantially equal to $V_d$, the high-side PWM signal 202 drops to zero along with the floating driving signal, so that the transistors are deactivated. At substantially the same time the low-side PWM signal 204 goes high, and the low-side driver 326 provides the stable driving signal to the transistor 116 thus activating the transistor.

At this point, the power supply device 100 is preferably operating in a steady-state mode, such that the transistor 116 and the transistors 320 and 322 have alternating activation periods as shown by the high-side PWM signal 202 and the low-side PWM signal 204 of FIG. 2. The alternating activation periods of the transistor 116 and the transistors 320 and 322 regulate the rectified input voltage from the diode bridge 102 to the substantially constant DC output voltage, $V_{OUT}$, across the capacitor 114. Additionally, a brown-out event can be detected when the input voltage is zero for a specific amount of time. The feedback circuit 106 then sends the brown-out control signal to the PFC module 108, which ends both the high-side PWM signal 202 and the low-side PWM signal 204. Thus, the high-side driver 324 and the low-side driver 324 end the driving signals, and the transistors 116, 320, and 322 are deactivated. Upon the next zero crossing after the input current resumes, the power supply device 100 begins in start-up mode. Based on the start-up beginning at a zero crossing, the inrush current of the power supply device 100 is reduced. It should be understood that the feedback circuit 106 and the PFC module 108 could be implemented with a dedicated Application Specific Integrated Circuit (ASIC) and the like.

Figure 4:
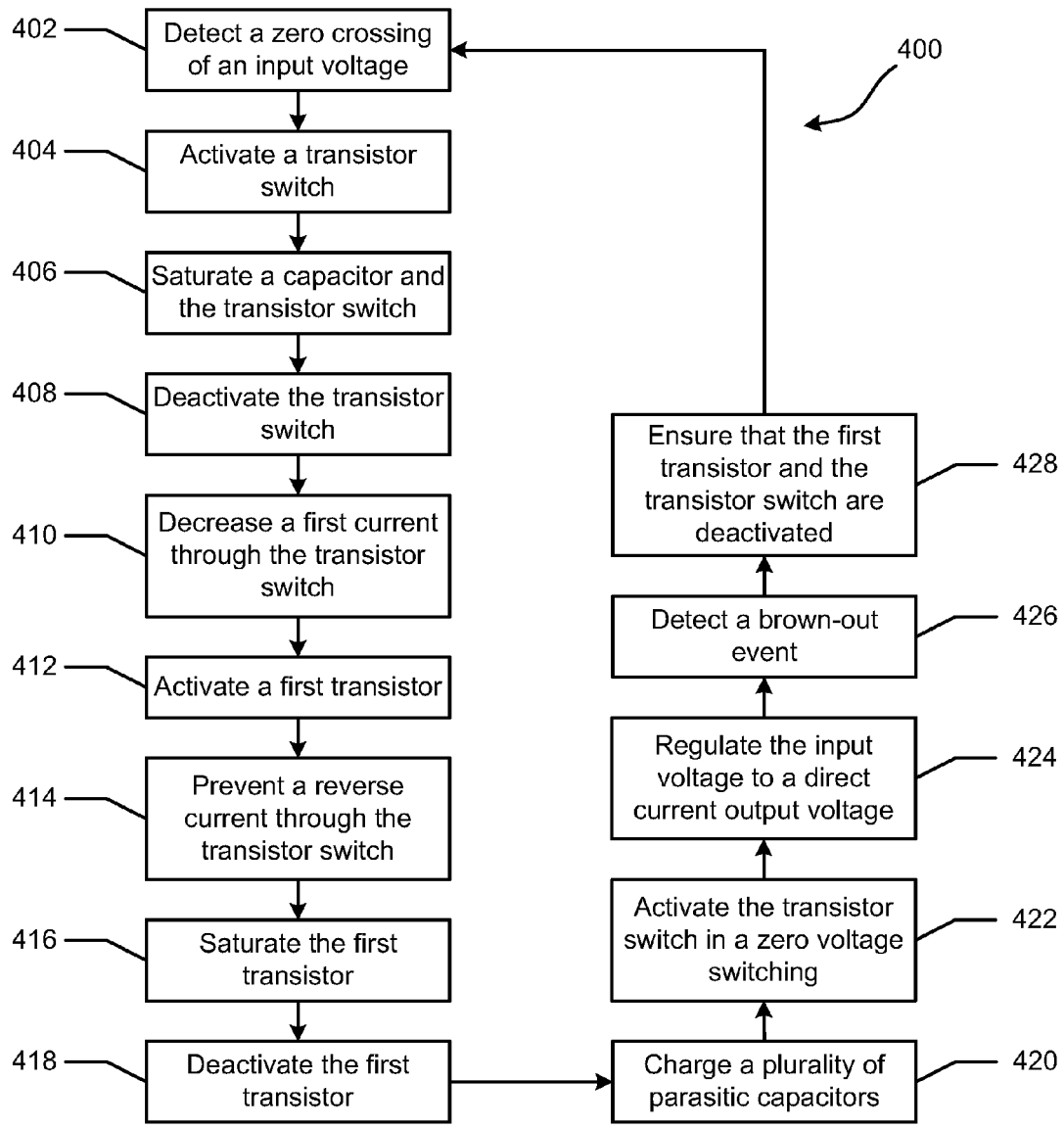
FIG. 4 is a flow diagram of a method for using synchronous switches to improve the efficiency of the power supply device.

The transistor 116 and MOSFET switch 104 are configured to increase the efficiency of the power supply device 100. FIG. 4 shows a flow diagram of a method 400 for using synchronous switches to improve the efficiency of a power supply device. At block 402, a zero crossing of an input voltage is detected. A transistor switch is activated at block 404. The transistor switch can include two MOSFET transistors. At block 406, a capacitor and the transistor switch are saturated. The transistor switch is deactivated at block 408. At block 410, a first current through the transistor switch is reduced based on the transistor switch being deactivated.

At block 412, a first transistor is activated. The first transistor can be a MOSFET transistor. At block 414, a reverse current through the transistor switch is prevented based on the transistor switch being deactivated. The first transistor is saturated at block 416. At block 418, the first transistor is deactivated. A plurality of parasitic capacitors charge at block 420. Each of the parasitic capacitors is associated with either the first transistor or the transistor switch. At block 422, the transistor switch is activated in a zero voltage switching transition based on the charge of the parasitic capacitors being substantially equal to $V_{OUT}$. The input voltage is regulated to a direct current output voltage at block 424. At block 426, a brown-out event is detected. At block 428, it is ensured that the first transistor and the transistor switch are deactivated, and the flow diagram continues as stated above at block 402.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power supply device comprising:
a driver circuit having first, second, and third terminals, and a fourth terminal connected to a first voltage reference, the driver circuit configured to provide a stable driving signal and a floating driving signal;
a transistor switch having a first terminal coupled to an input voltage, a second terminal connected to the first terminal of the driver circuit, and a third terminal connected to the second terminal of the driver circuit, the transistor switch configured to prevent a reverse current based on the floating driving signal; and
a first transistor having a first current electrode connected to the first terminal of the transistor switch, a second current electrode connected to the first voltage reference, and a control electrode connected to the third terminal of the driver circuit, the first transistor configured to activate and deactivate based on the stable driving signal, and further configured to regulate the input voltage to a substantially constant direct current output voltage, wherein the transistor switch further comprises:
a second transistor having a first current electrode coupled to the input voltage, a second current electrode connected to the second terminal of the driver circuit, and a control electrode connected to the first terminal of the driver circuit, the second transistor configured to activate and deactivate based on the floating driving signal; and a third transistor having a first current electrode connected to the second current electrode of the second transistor, a second current electrode, and a control electrode connected to the control electrode of the second transistor, the third transistor configured to activate and deactivate based on the floating driving signal.

2. The power supply device of claim 1 further comprising:
a power factor correction module having a first terminal connected to a fifth terminal of the driver circuit, and a second terminal connected to the sixth terminal of the driver circuit, the power factor correction module configured to provide a pulse width modulated signal to the driver circuit.

3. The power supply device of claim 2 wherein the driver circuit further comprises:
a high side driver having an input terminal connected to the first terminal of the power factor correction module, an output terminal connected to the second terminal of the transistor switch, and a control terminal connected to the third terminal of the transistor switch; and
a low side driver having an input terminal connected to the second terminal of the power factor correction module, a control terminal connected to the first voltage reference, and an output terminal connected to the control electrode of the first transistor.

4. The power supply device of claim 1 further comprising:
a feedback circuit having a first terminal connected to the input voltage, a second terminal connected to a third terminal of the power factor correction module, a third terminal connected to the first terminal of the transistor switch, a fourth terminal connected to a fifth terminal of the transistor switch, and a fifth terminal connected the first voltage reference, the feedback circuit configured to send a feedback signal to the power factor correction module based on the input voltage, a bulk voltage, an input current, and an output voltage.

5. The power supply device of claim 4 further comprising:
a current sensor having a terminal connected to a sixth terminal of the feedback circuit, the current sensor configured to measure the input current level.

6. The power supply device of claim 1 further comprising:
a diode bridge having first and second terminals connected to a second voltage reference, a third terminal connected to the first terminal of the transistor switch, and a fourth terminal connected to the first voltage reference, the diode bridge configured to rectify the input voltage.

7. The power supply device of claim 6 wherein the transistor switch is further configured to activate in a zero switching voltage transition.

8. The power supply device of claim 1 wherein the transistor switch and the first transistor are further configured to have alternate activation and deactivation periods, and to regulate the input voltage to a substantially constant direct current output voltage.

9. A method comprising:
activating a transistor switch in response to detecting a zero crossing of an input voltage;
saturating a capacitor and the transistor switch in response to activating the transistor switch;
decreasing a first current through the transistor switch upon deactivating the transistor switch;
increasing a second current through a first transistor upon activating the first transistor;
preventing a reverse current through the transistor switch;
deactivating the first transistor upon the first transistor being saturated;
charging a plurality of parasitic capacitors, each associated with one of the first transistor and the transistor switch;
activating the transistor switch in a lossless zero voltage switching based on a drain voltage of the first transistor being substantially equal to a bulk voltage level; and
regulating the input voltage to a direct current output voltage based on activating and deactivating the transistor switch and the first transistor.

10. The method of claim 9 further comprising:
detecting a brown-out event;
ensuring that the first transistor and the transistor switch are deactivated in response to the brown-out event.

11. The method of claim 10 wherein detecting the zero crossing of the input voltage, detecting the brown-out event, and detecting the bulk voltage level are at a feedback circuit.

12. The method of claim 9 further comprising:
reducing an inrush current based on activating the transistor switch in response to detecting a zero crossing of the input voltage.

13. The method of claim 9 further comprising:
increasing an efficiency of a power supply device based on activating the transistor switch in the lossless zero voltage switching.

14. The method of claim 9 wherein the transistor switch includes second and third transistors.

15. A method comprising:
activating a transistor switch in response to detecting a zero crossing of an input voltage;
decreasing a first current through the transistor switch upon deactivating the transistor switch;
increasing a second current through a transistor upon activating the transistor;
preventing a reverse current through the transistor switch;
deactivating the transistor upon the transistor being saturated;
activating the transistor switch in a lossless zero voltage switching based on a drain voltage of the transistor being substantially equal to a bulk voltage level; and
regulating the input voltage to a direct current output voltage based on activating and deactivating the transistor switch and the first transistor.

16. The method of claim 15 further comprising:
detecting a brown-out event;
ensuring that the transistor and the transistor switch are deactivated in response to the brown-out event.

17. The method of claim 16 wherein detecting the zero crossing of the input voltage, detecting the brown-out event, and detecting the bulk voltage level are at a feedback circuit.

18. The method of claim 15 further comprising:
reducing an inrush current based on activating the transistor switch in response to detecting a zero crossing of the input voltage.

19. The method of claim 15 further comprising:
increasing an efficiency of a power supply device based on activating the transistor switch in the lossless zero voltage switching.

* * * * *